United States Patent [19]
Kirby

[11] 4,353,431
[45] Oct. 12, 1982

[54] RECOIL REDUCING SYSTEM FOR GAS GUNS

[75] Inventor: Robert A. Kirby, Houston, Tex.

[73] Assignee: Exxon Production Research Company, Houston, Tex.

[21] Appl. No.: 164,631

[22] Filed: Jun. 30, 1980

[51] Int. Cl.$^3$ .............................................. G01V 1/02
[52] U.S. Cl. .................................. 181/118; 367/144; 367/145; 181/110; 181/120
[58] Field of Search ............... 181/110, 117, 118, 120; 367/144, 145; 89/1, 7, 198

[56] References Cited

U.S. PATENT DOCUMENTS

| | | | |
|---|---|---|---|
| 2,994,397 | 8/1961 | Huckabay | 367/145 |
| 3,048,816 | 8/1962 | Lubnow | 181/118 |
| 3,289,784 | 12/1966 | Cassand et al. | 181/118 |
| 3,397,755 | 8/1968 | Loper | 181/118 |
| 3,588,801 | 6/1971 | Leonard | 181/118 |
| 3,951,231 | 4/1976 | Leonard | 181/118 |
| 4,043,420 | 8/1977 | Zens et al. | 181/118 |
| 4,078,632 | 3/1978 | Horsman | 181/117 |
| 4,108,271 | 8/1978 | Chelminski | 181/120 |
| 4,156,979 | 6/1979 | Katseres | 89/198 |
| 4,193,472 | 3/1980 | Kirby | 181/118 |

FOREIGN PATENT DOCUMENTS

1240916  8/1960  France .................. 181/118

*Primary Examiner*—Nelson Moskowitz
*Attorney, Agent, or Firm*—James S. Hsue

[57] ABSTRACT

Disclosed herein are improvements in a recoil reducing system of a gas gun which create pulses in a liquid medium by introducing therein gas under high pressure. The release of high pressure gas from the barrel of such a gas gun causes recoil of the barrel. To reduce recoil, a reaction plate is attached to the barrel by metal rods so that the high pressure gas will impinge upon the reaction plate before escaping into the medium, and the force exerted on the reaction plate by the impinging gas will at least partially balance the force of recoil. In a preferred embodiment of this invention, a layer of shock absorbent material is interposed between the reaction plate and the impinging gas to absorb some of the energy of the gas. Flexing of the metal rods is thereby reduced and the life of the rods is extended. Alternatively, the flexing of the rods is reduced by connecting each rod to the reaction plate through a chain link type of connection comprising two rings, each ring passing through the other ring.

10 Claims, 4 Drawing Figures

RECOIL REDUCING SYSTEM FOR GAS GUNS

BACKGROUND OF THE INVENTION

1. Field of the Invention

This invention relates to improvements in seismic energy sources used to create pulses in a liquid medium such as water. In particular, it relates to improvements in recoil reducing systems of gas guns which create pulses in the medium by introducing therein gas under high pressure.

2. Description of the Prior Art

In marine seismic prospecting it has been common to use seismic sources known as gas guns to induce pulses of desired characteristics in the liquid medium. One frequently used kind of gas gun is shown in U.S. Pat. No. 4,193,472 (1980) to Kirby. This kind of gas gun comprises a barrel having an outlet at its lower end. The space inside the barrel defines an explosion chamber. Explosive gas is introduced into the explosion chamber and then ignited. A reaction plate is attached to the barrel and disposed below the outlet, so that gas from the explosion impinges upon the reaction plate before escaping into the surrounding medium. Thus the force exerted by the escaping gas on the barrel is at least partially balanced by the force exerted by the escaping gas upon the reaction plate. Recoil of the barrel is thereby reduced. The reaction plate is usually attached to the barrel by means of sturdy metal rods which can withstand the enormous force exerted by gas from the explosion upon the plate. These rods are usually welded to the reaction plate to form sturdy connections that can withstand the explosion.

When the gas escaping from the outlet impinges upon the reaction plate, the tremendous force exerted on the plate causes the portion of the plate not directly supported by the metal rods to flex downwardly with respect to the directly supported portion. Since the supporting metal rods are welded rigidly onto the reaction plate the metal rods are also caused to flex. It has been found that after a large number of explosions in the gun barrel, the constant flexing causes metal fatigue of the support rods so that these rods break just above the reaction plate. It is thus desirable to reduce the flexing of the support rods so that the life of the support rods is extended.

Rubber springs have been used in conjunction with gas guns in the seismic art. In U.S. Pat. No. 4,043,420 (1977) Zens et al discloses a gas detonator to be used in seismic surveys. The detonator comprises a circular bottom plate coupled to the earth, an annular top plate over the bottom plate, and a detonation chamber over the top plate having a bottom vent port communicating with the hole in the annular top plate. The port is closed when the top and bottom plates are engaged and the port is opened when the plates are disengaged. Rubber springs, mounted on bolts which are circumferentially disposed near the edges of the plates, resiliently urge the plates together. Detonation of a combustible gaseous mixture in the detonation chamber compresses the rubber springs and causes the bottom plate to move downwardly against the earth to create a seismic pulse. The top and bottom plates are separated and the port is opened to vent the exhaust gas. After the gas is vented, the compressed rubber springs force the plates to move towards each other, thereby closing the vent port. As disclosed in the Zens patent, the function of the rubber springs is to bring the plates together to close the vent port and to reduce chatter as the top and bottom plates meet so that a cleaner downward pulse is produced, and not to reduce the flexing of components in a recoil reducing system of a gas gun.

Loper in U.S. Pat. Nos. 3,371,740 (1968) and 3,397,755 (1968) discloses a braking system employed in a gas gun. Pressurized air is fed into and contained by a chamber with a vent port at its lower end. When the vent port opens, pressurized air is released into the water and a seismic pulse is created therein. The opening and closing of the vent port is controlled by a valve which moves downward when the valve is activated to open the vent port. As the valve moves downward, it enters a container containing water, and the water therein acts to brake the movement of the valve. Thus, Loper proposes to use confined water to brake the movement of the valve. Since the energy absorbed by water upon impact is usually negligible it will transmit the impact of the valve to the container without noticeable loss. If confined water is used to brake the impact of impinging gas upon the reaction plate in a recoil reducing system of a gas gun, the reduction of the impact will be negligible. Therefore, confined water cannot successfully be used to reduce the flexing of components in a recoil reducing system of a gas gun.

SUMMARY OF THE INVENTION

A frequently used type of gas gun comprises a barrel which holds gas and which has an outlet, and means for abruptly increasing the pressure of the gas in the barrel so that at least some of the gas escapes through the outlet into a liquid medium to create a pulse therein. An improved recoil reducing system for such a gas gun comprises a reaction member having a portion made of a shock absorbent material, and means for connecting the reaction member to the barrel. The connecting means connects the reaction member to the barrel in such a manner that at least some of the gas escaping through the outlet impinges upon the reaction member, and that some of the energy of the impinging gas is absorbed by the shock absorbent portion. The flexing of the different components of the recoil reducing system is thereby reduced.

Alternatively, the improved recoil reducing system comprises a reaction member and means for connecting the reaction member to the barrel, said connecting means comprising two loops passing through each other. The reaction member is disposed outside the barrel adjacent to and spaced from the outlet, so that at least some of the gas escaping through the outlet impinges upon the reaction member. One of the two loops in the connecting means is attached to the barrel, and the other loop to the reaction member. The two loops are such that they may rotate relative to each other along the direction of relative rotational motion between the two loops, such motion being caused by the impact of the impinging gas upon the reaction member.

DESCRIPTION OF THE PREFERRED EMBODIMENTS

Figure 1:
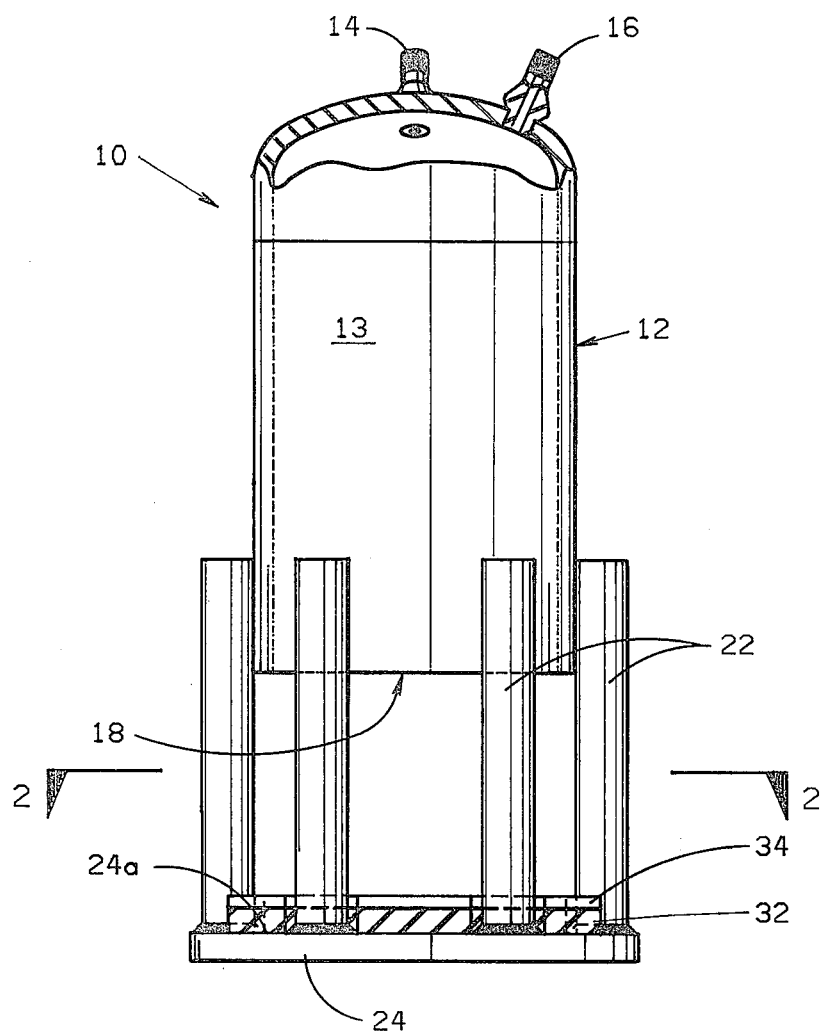
FIG. 1 is a schematic simplified view of a recoil reducing system employed in a gas gun illustrating the first preferred embodiment of this invention.

FIG. 1 is a schematic simplified view of a recoil reducing system employed in a gas gun illustrating the first preferred embodiment of this invention. Gas gun 10 is submerged in a liquid medium 8. As shown in FIG. 1, gas gun 10 comprises a barrel 12 defining an explosion chamber 13. Barrel 12 has conduits 14 and 16, and an outlet 18 through which chamber 13 communicates with medium 8. In the first preferred embodiment, barrel 12 may be a cylindrical pipe closed at one end and open at the other where the open end serves as outlet 18. A combustible mixture of gas such as propane and oxygen may be introduced into chamber 13 through conduit 16. The combustible gaseous mixture in chamber 13 is ignited by a flame front introduced into chamber 13 through conduit 16. High pressure gas from the explosion escapes from chamber 13 into medium 8 through outlet 18 thereby creating a seismic pulse in medium 8. The residual gas that remains in chamber 13 is then vented through conduit 14 in a conventional manner. For a conventional method for introducing and removing gas from chamber 13 as well as for igniting the gas therein, see U.S. Pat. No. 4,193,472 (1980) to Kirby. It will be obvious that other methods of introducing gas under pressure into chamber 13 and releasing the gas therein into medium 8 may be used.

To reduce the recoil of barrel 12 caused by gas escaping from barrel 12, a reaction plate 24 is attached to barrel 12 adjacent to outlet 18 by metal rods 22 in such a manner that at least some of the escaping gas from chamber 18 will impinge upon face 24a of reaction plate 24 before escaping into medium 8. The recoil of barrel 12 is thereby reduced as explained in the patent to Kirby referred to above. In the first preferred embodiment, reaction plate 24 may be a flat, circular plate and rods 22 may be welded to face 24a near the circumference of plate 24.

If gas from the explosion in chamber 13 is allowed to impinge directly upon face 24a of reaction plate 24, it has been found that after a large number of explosions, rods 22 break just above face 24a. Since the center portion of reaction plate 24 is not connected to barrel 12 by rods 22 or otherwise directly supported, the impact of the impinging gas upon face 24a will cause the center portion of plate 24 to flex or bend with respect to the circumference of the plate. Since metal rods 22 are welded rigidly onto plate 24, rods 22 will also bend or flex, particularly near their connections to plate 24. Such constant flexing causes metal fatigue of rods 22 and their consequent failure just above plate 24.

To reduce the flexing of rods 22 and to expand their useful life, a layer of shock absorbent material 32 may be interposed between face 24a and the impinging gas from the explosion in chamber 13. Layer 32 will absorb some of the energy of the impinging gas and convert it to heat, thereby reducing the impact of the impinging gas and therefore the bending of plate 24. The flexing of rods 22 is thereby also reduced. If the shock absorbent material in layer 32 is also resilient, layer 32 also acts as a spring; when pressured by the impinging gas, layer 32 is compressed. Thus, part of the energy of the impinging gas is converted and stored as compression of layer 32. When compressed layer 32 extends, part of the energy stored is then transmitted to plate 24. This transmission of energy from the impinging gas to layer 32 and then to plate 24 takes place over a longer period of time compared to the transmission time when the impinging gas directly impacts plate 24. The transmission of energy over a longer period of time reduces the magnitude of pressure exerted upon plate 24 at any one instant (the instantaneous impact) by the impinging gas, and therefore reduces the amount of bending of plate 24. Thus the bending of plate 24 and rods 22 may be further reduced by a shock absorbent layer 32 that is also resilient.

Figure 2:
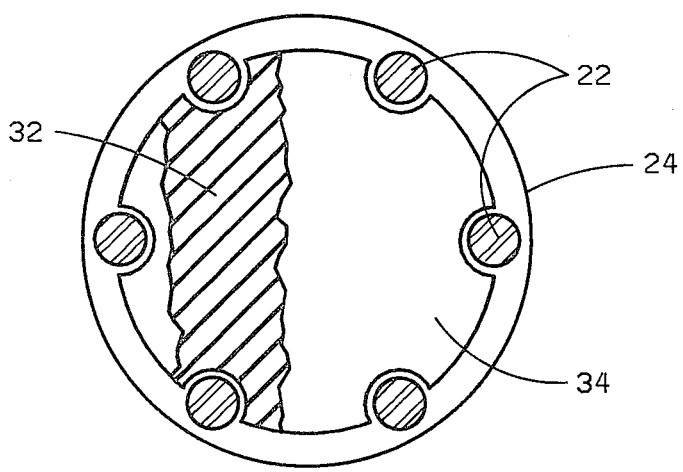
FIG. 2 is a view taken along line 2—2 in FIG. 1 wherein the partially cut away view shows a shock absorbent neoprene disk underneath a protection plate.

To prevent the impinging gas from the explosion in chamber 13 from damaging the layer of shock absorbent material 32, a protection plate 34 may be placed on top of layer 32 so that plate 34 shields at least part of layer 32 from the impinging gas. FIG. 2 is a view taken along line 2—2 in FIG. 1 wherein the partially cut away view shows that layer 32 lies underneath protection plate 34. Protection plate 34 is preferably not attached to reaction plate 24 or rods 22, since such an attachment may serve as an alternate route to layer 32 through which impact of impinging gas is transmitted to reaction plate 24, thereby reducing the effectiveness of layer 32. Protection plate 34 is preferably shaped in such a manner that it is free to move between outlet 18 and layer 32 in the direction of the impinging gas but constrained in directions perpendicular to the direction of the impinging gas. Shaped in this manner, protection plate 34 need not be attached to reaction plate 24 or rods 22. In the first preferred embodiment, layer 32 and plate 34 are flat circular plates approximately the same size as reaction plate 24, with portions cut away allowing for attachment of rods 22 to plate 24. Shaped in this manner, both layer 32 and plate 34 are free to move vertically so that they will perform the shock absorbing function but constrained horizontally by rods 22 so that they will not be lost or mispositioned during operation of the gas gun.

The system of the first preferred embodiment just described has been constructed and used in marine seismic investigations. It has been found that the life of metal rods 22 connecting the reaction plate to the gas gun barrel is significantly extended.

It will be evident, however, that other shapes and sizes of layer 32 and plate 34 may be used to accomplish the shock absorbing and resilient function described above and are within the scope of this invention. Preferably, layer 32 is constructed from a material resistant to hydrocarbons and salt water, such as neoprene. Natural rubber may also be satisfactorily used even though it is less resistant to hydrocarbons than neoprene. Plate 34 is preferably made of a hard metal such as steel. It will also be evident that reaction plate 24, shock absorbent layer 32 and protection plate 34 may be replaced by one or more reaction members that are shock absorbent. Such a member or members also come within the scope of this invention.

Figure 3:
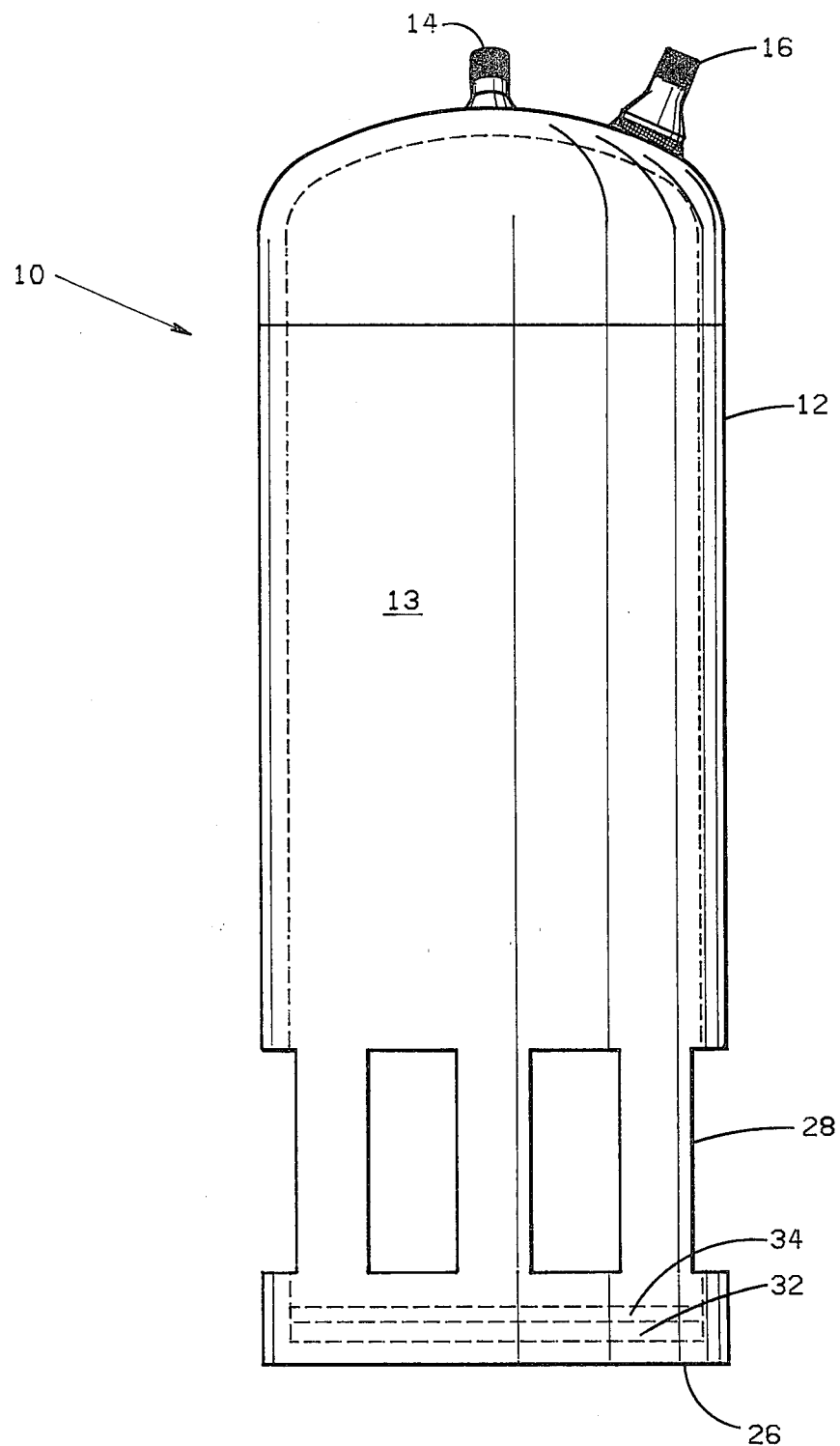
FIG. 3 is a schematic simplified view of a recoil reducing system employed in a gas gun illustrating a slightly modified version of the first preferred embodiment of the invention.

FIG. 3 illustrates a slightly modified version of the first preferred embodiment. FIG. 3 shows a gas gun similar to the one in FIG. 1, except that the lower end of barrel 12 is closed, and that there is no reaction plate, or connecting rods attached to barrel 12. The closed lower end 26 of barrel 12 serves the function of a reaction plate in reducing recoil of barrel 12. Gas released in chamber 13 escapes through one or more vent ports 28 in the side wall of barrel 12 just above end 26. A layer 32 of shock absorbent material and a protection plate 34 are interposed between the impinging gas and end 26 in a manner similar to that described for the gas gun in FIG. 1. Impact of the impinging gas on end 26 is similarly reduced. Therefore, flexing of recoil reducing end 26, and of the portion of barrel 12 contiguous to end 26 is also reduced.

Figure 4:
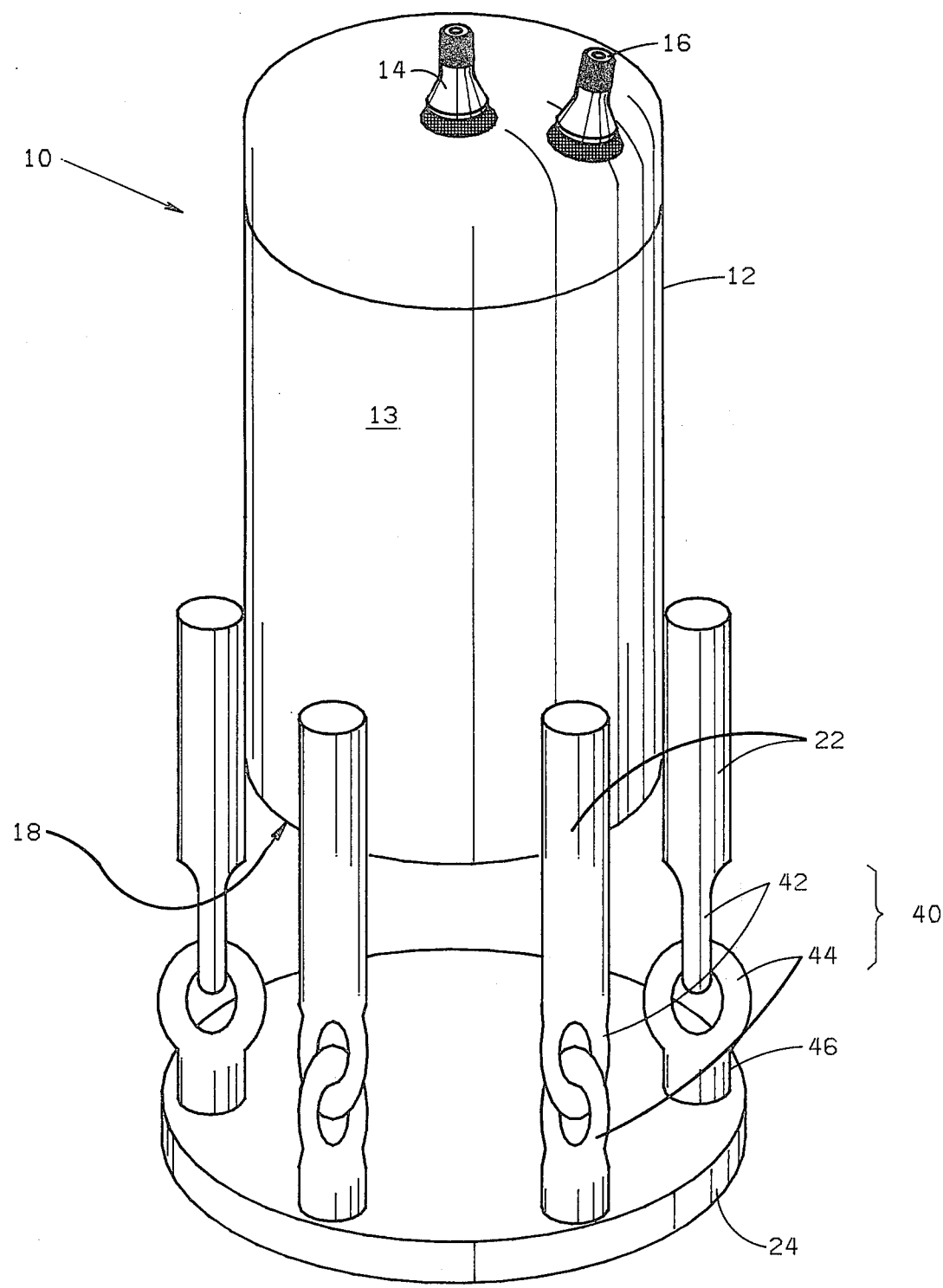
FIG. 4 is a simplified perspective view of a recoil reducing system employed in a gas gun illustrating the second preferred embodiment of the invention.

As described in connection with the gas gun in FIG. 1, the rods connecting the reaction plate to the barrel flex because the rods rigidly connect the reaction plate to the barrel. Thus the flexing of the rods may be reduced by making one or more of the connections of the rods to the reaction plate movable. Flexing of the rods may also be reduced by making one or more or the connections of the rods to the barrel movable. Therefore, as an alternative to the recoil reducing system already described, flexing of the components of a recoil reducing system may be reduced by employing one or more movable connections as part of the connection between the reaction plate and the barrel. FIG. 4 is a simplified perspective view of a recoil reducing system employed in a gas gun illustrating the second preferred embodiment of the invention. In reference to FIG. 4, a combustible gaseous mixture is introduced into and detonated in chamber 13 in a manner similar to that described for the gas gun in FIG. 1. Gas from the explosion impinges upon reaction plate 24 as before. For at least one of the rods 22, the lower end that is to be connected to the reaction plate 24 comprises a ring 42. Another ring 44 is linked up with ring 42 like two sections of a chain, with each ring passing through the other ring, forming a movable connection 40. Ring 44 has a protruding portion 46 which is welded to plate 24. Impact of the impinging gas will cause ring 44 to rotate slightly relative to ring 42. The chain link type connection between rings 42, 44 allows such relative rotational motion and reduces the flexing of the rod 22 that is attached to ring 42. It will be appreciated that the circular shape of rings 42, 44 is not a necessary feature of this invention. Two loops of any shape may be used to replace rings 42, 44 so long as when connected in chain link fashion, the two loops allow similar relative rotational motion between them, such motion being caused by impact of impinging gas upon plate 24.

In the second preferred embodiment shown in FIG. 4, rods 22 are attached by movable connections 40 to a flat circular reaction plate 24 near its circumference. Rings 44 are oriented so that the plane of each ring is perpendicular to the plane of plate 24, and intercepts the plane of circular plate 24 along a diameter. Rings 42 are oriented so that the plane of each of rings 42 is perpendicular to the plane of the ring 44 that it is linked up with. As the center portion of plate 24 is forced by the impinging gas to move downward and hence bend with respect to the circumference of the plate 24, rings 44 will rotate in planes that are perpendicular to the plane of plate 24, and that intercept the plane of plate 24 along its diameters. The orientations of rings 42, 44 in the second preferred embodiment described above will allow rings 44 to rotate with maximum freedom in the direction of relative rotational motion between the two rings, such motion being caused by the impact of the impinging gas upon reaction plate 24. With rings 42, 44 oriented as described, rings 42 will be isolated to the maximal degree from forces that cause rings 44 to rotate with respect to rings 42. A layer of shock absorbent material and a protection plate may be added as in the first preferred embodiment to further reduce the flexing of the rods 22.

I claim:

1. An apparatus for reducing recoil of gas gun for generating pulses in a liquid medium, said gas gun including a barrel which holds gas and which has an outlet, said gas gun further including means for abruptly increasing the pressure of the gas in the barrel so that at least some of the gas escapes through the outlet into the liquid medium to create a pulse therein, said apparatus comprising:

a reaction plate having a face;

means for connecting the reaction plate to the barrel in such a manner that the reaction plate is disposed outside the barrel and adjacent to and spaced from the outlet, so that at least some of the gas escaping through the outlet impinges upon said face of the reaction plate to reduce recoil of the barrel caused by the escaping gas;

a layer of shock absorbent material interposed between said face and the outlet to absorb some of the energy of the impinging gas, so that the amounts of bending of the reaction plate and of the connecting means caused by the impinging gas are reduced; and a protection plate interposed between said shock absorbing layer and the outlet, so that at least a part of said layer is protected from direct impact by the impinging gas.

2. An apparatus as in claim 1, wherein said layer of shock absorbent material is also resilient.

3. An apparatus as in claim 1, wherein said layer of shock absorbent material is resistant to hydrocarbons and salt water.

4. An apparatus as in claim 1, wherein said layer of shock absorbent material comprises neoprene.

5. An apparatus as in claim 1, wherein said protection plate is free to move between the outlet and said layer in the direction of the impinging gas, but is contrained in directions perpendicular to the direction of the impinging gas.

6. An apparatus as in claim 1, wherein said protection plate is made of steel.

7. An apparatus for reducing recoil of a gas gun for generating pulses in a liquid medium, said gas gun including a hollow cylinder closed at both ends defining a chamber which holds gas and which has an outlet on the cylindrical surface of the cylinder communicating between the chamber and the liquid medium, said gas gun further including means for abruptly increasing the pressure of the gas in the chamber so that at least some of the gas escapes through the outlet into the liquid medium to create a pulse therein, said apparatus comprising:

a reaction member comprising one end of the cylinder and having a portion which is composed of a shock absorbent material; and means for connecting said reaction member to said cylinder in such a manner that the outlet is adjacent to said reaction member, that at least some of the gas escaping through the outlet impinges upon said reaction member to reduce recoil of the cylinder caused by the impinging gas, and that some of the energy of the impinging gas is absorbed by said portion to reduce bending of the reaction member and of the connecting means.

8. The apparatus of claim 7 wherein said portion comprises a layer of shock absorbent material interposed between the impinging gas and the end of the cylinder which is part of the reaction member.

9. A gas gun for generating pulses in a liquid medium comprising:

a hollow cylinder closed at both ends defining a chamber which holds gas and which has an outlet on the cylindrical surface of the cylinder communicating between the chamber and the liquid medium;

means for abruptly increasing the pressure of the gas in the chamber so that at least some of the gas escapes through the outlet into the liquid medium to create a pulse therein;

a reaction member comprising one end of the cylinder and having a portion which is composed of a shock absorbent material; and means for connecting said reaction member to said barrel in such a manner that the outlet is located adjacent to said reaction member, that at least some of the gas escaping through the outlet impinges upon said reaction member to reduce recoil of the barrel caused by the impinging gas, and that some of the energy of the impinging gas is absorbed by said portion to reduce bending of the reaction member and of the connecting means.

10. The apparatus of claim 9 wherein said portion comprises a layer of shock absorbent material interposed between the impinging gas and the end of the cylinder which is part of the reaction member.

* * * * *